US007934091B2

(12) United States Patent
Stamos et al.

(10) Patent No.: US 7,934,091 B2
(45) Date of Patent: *Apr. 26, 2011

(54) DIGITAL ASSET USAGE ACCOUNTABILITY VIA EVENT JOURNALING

(75) Inventors: Nicholas Stamos, Belmont, MA (US);
Seth N. Birnbaum, Boston, MA (US);
Tomas Revesz, Jr., Waltham, MA (US);
Donato Buccella, Watertown, MA (US);
Keith A. MacDonald, Watertown, MA (US); Dwayne A. Carson, Mendon, MA (US); William E. Fletcher, Acton, MA (US)

(73) Assignee: Verdasys, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,125

(22) Filed: Dec. 9, 2008

(65) Prior Publication Data

US 2009/0198765 A1    Aug. 6, 2009

Related U.S. Application Data

(63) Continuation of application No. 10/716,336, filed on Nov. 18, 2003, now Pat. No. 7,472,272, which is a continuation of application No. 10/655,573, filed on Sep. 4, 2003, now abandoned.

(60) Provisional application No. 60/442,464, filed on Jan. 23, 2003.

(51) Int. Cl.
*H04L 9/00*    (2006.01)
(52) U.S. Cl. ................. 713/164; 726/7; 726/26; 726/27; 705/51
(58) Field of Classification Search .......... 713/164–165; 726/6–7, 26–27; 709/202; 719/317; 705/51
See application file for complete search history.

(56) References Cited

U.S. PATENT DOCUMENTS 5,032,979 A    7/1991    Hecht et al.
(Continued)

FOREIGN PATENT DOCUMENTS

JP    07-295892 A    11/1995
(Continued)

OTHER PUBLICATIONS

"Planning for CA-ACF2 Migration to OS/390 Security Server (RACF)," *IBM International Technical Support Organization*, Poughkeepsie, NY, 1st ed. (1996).

(Continued)

*Primary Examiner* — Benjamin E Lanier
*Assistant Examiner* — Samson Lemma
(74) *Attorney, Agent, or Firm* — Hamilton, Brook, Smith & Reynolds, P.C.

(57) ABSTRACT

A technique for establishing a perimeter of accountability for usage of digital assets such as data files. The accountability model not only tracks authorized users' access to files, but monitors passage of such files to uncontrollable removable storage media or through network connections and the like which may indicate possible abuse of access. In accordance with a preferred embodiment, an autonomous independent agent process running at a point of use, such as in the background of a client operating system kernel, interrupts requests for access to resources. The agent process senses low level system events, filters, aggregates them, and makes reports to a journaling server. The journaling server analyzes sequences of low level events to detect when aggregate events of interest occur, such as "FileEdit", network file transfers and the like. Reports can be generated to provide an understanding of how digital assets have been accessed, used or communicated by individuals in an enterprise.

20 Claims, 12 Drawing Sheets

U.S. PATENT DOCUMENTS

| | | | |
|---|---|---|---|
| 5,666,411 | A | 9/1997 | McCarty |
| 5,692,124 | A | 11/1997 | Holden et al. |
| 5,897,635 | A | 4/1999 | Torres et al. |
| 6,118,862 | A | 9/2000 | Dorfman et al. |
| 6,163,506 | A * | 12/2000 | Mundy .......................... 368/10 |
| 6,192,403 | B1 | 2/2001 | Jong et al. |
| 6,427,140 | B1 | 7/2002 | Ginter et al. |
| 6,510,513 | B1 | 1/2003 | Danieli |
| 6,678,883 | B1 | 1/2004 | Berry et al. |
| 6,754,890 | B1 | 6/2004 | Berry et al. |
| 6,839,896 | B2 | 1/2005 | Coffman et al. |
| 6,990,513 | B2 * | 1/2006 | Belfiore et al. ............... 709/203 |
| 7,100,047 | B2 | 8/2006 | Stamos et al. |
| 7,165,174 | B1 * | 1/2007 | Ginter et al. .................. 713/153 |
| 7,281,011 | B1 | 10/2007 | Bradley et al. |
| 7,281,020 | B2 | 10/2007 | Fine |
| 7,409,547 | B2 | 8/2008 | Stamos et al. |
| 7,454,462 | B2 * | 11/2008 | Belfiore et al. ............... 709/203 |
| 7,472,272 | B2 | 12/2008 | Stamos et al. |
| 7,814,021 | B2 | 10/2010 | Stamos et al. |
| 2001/0042043 | A1 | 11/2001 | Shear et al. |
| 2002/0002609 | A1 | 1/2002 | Chung et al. |
| 2002/0118220 | A1 | 8/2002 | Lui et al. |
| 2002/0120685 | A1 | 8/2002 | Srivastava et al. |
| 2002/0161766 | A1 | 10/2002 | Lawson et al. |
| 2002/0165988 | A1 | 11/2002 | Khan et al. |
| 2002/0178271 | A1 | 11/2002 | Graham et al. |
| 2003/0005174 | A1 | 1/2003 | Coffman et al. |
| 2003/0051026 | A1 | 3/2003 | Carter et al. |
| 2003/0120935 | A1 | 6/2003 | Teal et al. |
| 2003/0145235 | A1 | 7/2003 | Choo |
| 2003/0169306 | A1 | 9/2003 | Makipaa et al. |
| 2004/0039809 | A1 | 2/2004 | Ranous et al. |
| 2004/0044912 | A1 * | 3/2004 | Connary et al. ............. 713/201 |
| 2004/0054894 | A1 | 3/2004 | Lambert |
| 2004/0181794 | A1 | 9/2004 | Coleman et al. |
| 2004/0255160 | A1 | 12/2004 | Stamos et al. |
| 2005/0060537 | A1 | 3/2005 | Stamos et al. |
| 2008/0034228 | A1 * | 2/2008 | Shear et al. .................. 713/194 |
| 2008/0288775 | A1 * | 11/2008 | Baier et al. ................... 713/157 |

FOREIGN PATENT DOCUMENTS

| | | |
|---|---|---|
| JP | 11-017915 A | 1/1999 |
| JP | 2001-184264 A | 7/2001 |
| JP | 2002-175210 A | 6/2002 |
| WO | WO 00/22777 A1 | 4/2000 |
| WO | WO 2004/066082 A2 | 8/2004 |
| WO | WO 2004/066085 A2 | 8/2004 |
| WO | WO 2004/066541 A2 | 8/2004 |

OTHER PUBLICATIONS

Kirichenko, A., "F-Secure Kennel Mode Cryptographic Driver, FIPS 140-2 Validation Security Policy," F-Secure Corp., Dec. 2001 entire document, cs-www.ncsi.nist.gov/cryptval/140-1/120sp/140sp237.pdf.

Reid, Jason, F., et al., DRM, Trusted Computing and Operating System Architecture', 2005, Information Security Research Centre, Queensland Univer. of Technology, entire document, 'http://crpit.com/confpapers/CRPITV44Reid.pdf'.

International Search Report from International Application No. PCT/US2004/001454, Dated: Dec. 10, 2004.

Written Opinion of the International Searching Authority from International Application No. PCT/US2004/001454, Dated: Dec. 10, 2004.

International Search Report from International Application No. PCT/US2004/001508, Dated: Dec. 17, 2004.

Written Opinion of the International Searching Authority from International Application No. PCT/US2004/001508, Dated: Dec. 17, 2004.

Reply to Written Opinion from International Application No. PCT/US2004/001454, Dated: Mar. 10, 2005.

Reply to Written Opinion from International Application No. PCT/US2004/001508, Dated: Mar. 16, 2005.

International Search Report from International Application No. PCT/US2004/001529, Dated: May 6, 2005.

Written Opinion of the International Searching Authority from International Application No. PCT/US2004/001529, Dated: May 6, 2005.

Reply to Written Opinion from International Application No. PCT/US2004/001529, Dated: Aug. 8, 2005.

International Preliminary Report on Patentability from International Application No. PCT/US2004/001454, Dated: Oct. 21, 2005.

International Preliminary Report on Patentability from International Application No. PCT/US2004/001529, Dated: May 15, 2006.

International Search Report from International Application No. PCT/US2005/040395, Dated: Sep. 5, 2007.

Written Opinion of the International Searching Authority from International Application No. PCT/US2005/040395, Dated: Sep. 5, 2007.

International Preliminary Report on Patentability from International Application No. PCT/US2004/001508, 4 pages, Dated: Dec. 17, 2008.

Blaze, M., "A Cryptographic File System for Unix," Conference on Computer and Communications Security, Proceedings of the 1st ACM Conference on Compute, ACM, 1993, pp. 9-16.

Wespi, A., et al., "Intrusion Detection Using Variable-Length Audit Trail Patterns," *RAID 2000*, H. Debar, L. Mé, eds. (Berlin Heidelbergp: Springer-Verlag ), pp. 110-129 (2000).

Chari and Cheng, "BlueBoX: A Policy-Driven, Host-Based Intrusion Detection System," Proceedings of the Network and Distributed System Security Symposium, San Diego, California, USA (2002).

Lunt, T.F. et al., "A Real-Time Intrusion-Detection Expert System (IDES)," (SRI Project 6784). Washington, D.C.: SPAWAR (Feb. 1992).

"HIBUN/Enterprise," Open Space HAND Library, p. 18, Hitac2003-1, (mechanical English translation).

* cited by examiner

| Action Type | Level | Event Category | Event Name | Event Table | Action Detail Field | Action Detail Value | Discriminant |
|---|---|---|---|---|---|---|---|
| 1 | Low | File | FileRead | FileEvent | operationType | 0 | bytesRead > 0, bytesWritten = 0 |
| 2 | Low | File | FileWrite | FileEvent | operationType | 0 | bytesRead = 0, bytesWritten > 0 |
| 3 | Low | File | FileReadWrite | FileEvent | operationType | 0 | bytesRead > 0, bytesWritten > 0 |
| 4 | Low | File | FileCopy | FileEvent | operationType | 1 | |
| 5 | Low | File | FileRename | FileEvent | operationType | 2 | |
| 6 | Low | File | FileDelete | FileEvent | operationType | 3 | |
| 7 | Low | File | FileMove | FileEvent | operationType | 4 | |
| 8 | Low | File | FileRecycle | FileEvent | operationType | 5 | |
| 9 | Low | File | FileRestore | FileEvent | operationType | 6 | |
| 10 | Low | Network | TCPIPInbound | NetworkEvent | protocolType | TCPIP | isOutbound = 0 |
| 11 | Low | Network | TCPIPOutbound | NetworkEvent | protocolType | TCPIP | isOutbound = 1 |
| 12 | Low | Network | UDPInbound | NetworkEvent | protocolType | UDP | isOutbound = 0 |
| 13 | Low | Network | UDPOutbound | NetworkEvent | protocolType | UDP | isOutbound = 1 |
| 14 | Low | Network | IPSECInbound | NetworkEvent | protocolType | IPSEC | isOutbound = 0 |
| 15 | Low | Network | IPSECOutbound | NetworkEvent | protocolType | IPSEC | isOutbound = 1 |
| 16 | Low | Print | Print | PrintEvent | (implied) | N/A | |
| 17 | Low | CD | CDRead | CDEvent | operationType | 1 | |
| 18 | Low | CD | CDWrite | CDEvent | operationType | 2 | |
| 19 | Low | Clipboard | ClipboardCutCopy | ClipboardEvent | eventType | CutCopy | |
| 20 | Low | Clipboard | ClipboardPaste | ClipboardEvent | eventType | Paste | |
| 21 | Low | User | UserLogon | UserEvent | eventType | Logon | |
| 22 | Low | User | UserLogoff | UserEvent | eventType | Logoff | |
| 23 | Low | Machine | Machine | MachineEvent | eventType | ... | Skip the Machine events |

FIG. 4A

| | | | ProcessStart | Process | (Implied) | Use processStartDtTm |
|---|---|---|---|---|---|---|
| | | | ProcessEnd | Process | (Implied) | Use processEndDtTime |
| 24 | Low | Process | | | | |
| 25 | Low | Process | | | | |
| 26 | High | File | FileEdited | AggregateEvent | | |
| 27 | High | File | FileCopied | AggregateEvent | | |
| 28 | High | File | FileSaveAs | AggregateEvent | | |
| 29 | High | File | FileLeftThroughRemovableMedia | AggregateEvent | | |
| 30 | High | Clipboard | ClipboardToFile | AggregateEvent | | |
| 31 | High | Print | PrintFile | AggregateEvent | | |
| 32 | High | CD | BurnMaster | AggregateEvent | | |
| 33 | High | CD | BurnFile | AggregateEvent | | |
| 34 | High | Network | FileLeftThroughNetworkPort | AggregateEvent | | |
| 35 | High | Network | EmailFile | AggregateEvent | | |
| 36 | High | Network | RemoteAccess | AggregateEvent | | |
| 37 | High | Network | InstantMessenger | AggregateEvent | | |
| 38 | High | Network | P2PApp | AggregateEvent | | |
| 39 | High | Network | FTPFile | AggregateEvent | | |
| 40 | High | Network | TunnelOut | AggregateEvent | | |
| 41 | High | Network | TunnelIn | AggregateEvent | | |
| 42 | High | Network | TunnelInOut | AggregateEvent | | |
| 43 | High | Network | FileOutThroughTunnel | AggregateEvent | | |

FIG. 4B

| Event Name | Constituent Event Types | Pattern | Scope |
|---|---|---|---|
| FileEdited | FileRead, FileWrite, FileReadWrite | Same processid and fileHandle. beforeHash of first read & afterHash of last write differ. Both reads and writes to same fileHandle. Sum of writes > 0. | Thread |
| FileCopied | FileRead, FileWrite, FileReadWrite, FileCopy | Command shell: Alternating reads & writes. The reads all have one filehandle, the writes all have a second one.<br><br>Explorer: A long series of reads from one filehandle followed by a long series of writes to a second. Mind the time period between. | Thread |
| FileSaveAs | FileRead, FileWrite, FileReadWrite | An app reads one or more files then writes a file. | Process |
| FileLeftThroughRemovableMedia | FileRead, FileWrite, FileReadWrite, FileCopy | Same as FileCopied or FileSaveAs, but target device is removable.<br><br>In both cases, the target device must not be removable. | Process |
| ClipboardToFile | ClipboardCutCopy, ClipboardPaste | Pair a ClipboardCutCopy with all subsequent Clipboard Paste events for that user login until the next copy or the user logs out.<br><br>Problem: If the user closes the application that performed the copy and the object was large and the user opts not to keep it there, what happens ? | Login |

FIG. 5A

| | | | |
|---|---|---|---|
| PrintFile | Print, possibly others | Unclear. If there are temp files, intermediate PDF files, etc. then we may perform a chain of custody analysis to figure out just what was printed. | Thread |
| BurnMaster | FileRead, FileWrite | An app known to burn files reads one or more files then writes a file. | Process |
| BurnFile | CDWrite, FileRead | Application is recognized as a CD writing app. (Optional) Series of FileReads from one fileHandle, followed by a series of CDWrite events with the same process. May need to compare filenames, otherwise one read will exhaust all the writes. Alternately, all read files are lumped together with one large burn event. Or perhaps the first read of a new file after the last read from the previous file is the start of the next burn event. | Process |
| FileLeftThroughNetworkPort | FileRead, TCPIPInbound, TCPIPOutbound, UDPInbound, UDPOutbound, IPSECInbound, IPSECOutbound | An overlapping stream of FileReads interspersed with Inbound and Outbound network events. All the network events should be for the same port (?) and to a destination NOT on localhost. All the network events should be for the same protocol. | Thread |
| EMailFile | FileRead, TCPIPInbound, TCPIPOutbound (other protocols???) | Similar to FileLeftThroughNetworkPort. Combines all interleaving FileReads with the network events. The application image name is one of those known to be an email program. May place constraints on the ports, since many emailers use certain well defined ports for SMTP, POP, etc. | Process |

FIG. 5B

| | | | |
|---|---|---|---|
| InstantMessenger | FileRead, TCPIPInbound, TCPIPOutbound, (other protocols???) | Similar to FileLeftThroughNetworkPort. Combines all interleaving FileReads with the network events.<br><br>The application image name is one of those known to be used for instant Messenger.<br><br>May place constraints on the ports. | Process |
| P2PApp | FileRead, TCPIPInbound, TCPIPOutbound, UDPInbound, UDPOutbound, IPSECInbound, IPSECOutbound | Constrain the application name to be one of those known to be a P2PApp.<br><br>Multiple ports will be used; some or all of them may have constraints.<br>May constrain the protocol per app or per instance.<br><br>Similar to FileLeftThroughNetworkPort as concerns interleaved file reads. | Process |
| FTPFile | FileRead, FileWrite, ??? (TCPIPInbound), TCPIPOutbound | May want to split into two events, one for reading and one for writing.<br><br>Constrain to the common FTP port, unless the app is known by name to be an FTP client.<br><br>Like FileLeftThroughNetworkPort, look for interleaved reads and network events, or interleaved writes and network events. | Process |
| RemoteAccess | TCPIPInbound, TCPIPOutbound, UDPInbound, UDPOutbound, IPSECInbound, IPSECOutbound | Do not incorporate FileRead events.<br>Several ports may be used.<br>Look for known image names of remote apps. | Process |

FIG. 5C

| | | | |
|---|---|---|---|
| TunnelOut | TCPIPInbound, TCPIPOutbound, UDPInbound, UDPOutbound, IPSECInbound, IPSECOutbound | All events use same protocol. Only two processes used. Two different apps and four ports are used. One of the ports is remote.<br>Event 1: The first app sends outbound from local port 1 to local port 2.<br>Event 2: The second app (the tunneler) receives inbound from local port 1 to local port 2.<br>Event 3: The tunneler also sends from local port 3 to remote port 4. Both events of the tunneler share the same thread (probably). | Login |
| TunnelIn | TCPIPInbound, TCPIPOutbound, UDPInbound, UDPOutbound, IPSECInbound, IPSECOutbound | All events use same protocol. Only two processes used. Two different apps and four ports are used. one of the ports is remote.<br>Event 1: The first app (the tunneler) receives inbound from remote port 1 to local port 2.<br>Event 2: The tunneler sends outbound from local port 2 to local port 3.<br>Event 3: The second app also receives inbound from local port 3 to local port 4.<br>Both events of the tunneler share the same thread (probably). | Login |
| TunnelInOut | TCPIPInbound, TCPIPOutbound, UDPInbound, UDPOutbound, IPSECInbound, IPSECOutbound | Multiple protocols may be used. More research needed. More than three ports are used. | Login |
| FileLeftThroughTunnel | FileRead, TunnelOut | Similar to FileLeftThroughNetworkPort. Combines all interleaving FileReads involving a process that is participating in a TunnelOut event.<br>If more than one file is read, the source destination will be a count of the files read. | Login? |

FIG. 5D

Risk Summary Report

Digital Assets Moved to Uncontrolled Media    Choose Aggregate Type: Average MBytes/User ▾

|  | Today | This Week | This Month | This Quarter |
|---|---|---|---|---|
| + CD/DVD-Rom | 207 | 649 | 2,246 | 5,409 |
| + Fixed | 128 | 754 | 3,142 | 8,961 |
| + Ramdisk | 0 | 0 | 0 | 0 |
| + Removable | 0 | 43 | 43 | 127 |

Level 1: Drivetype

Digital Assets Moved to External Networks    Choose Aggregate Type: Average MBytes/User ▾

|  | Today | This Week | This Month | This Quarter |
|---|---|---|---|---|
| Enterprise Average | 1,039 | 20,903 | 529,390 | 8,938,485 |

Select Level 1 Detail: Application Domain Port Group

FIG. 6A

Risk Summary Report

Digital Assets Moved to Uncontrolled Media  Choose Aggregate Type: Average MBytes/User  Show Query Options √Summary >>Trends >>File Activity >>Network Activity >>Combined Activity

| | Today | This Week | This Month | This Quarter |
|---|---|---|---|---|
| + CD/DVD-Rom | 207 | 649 | 2,246 | 5,409 |
| + Admin (3) | 0 | 0 | 0 | 20 |
| − Engineering (9) | 311 | 2,148 | 9,349 | 27,643 |
|   − Development (6) | 622 | 4,296 | 18,698 | 55,286 |
|     Anderson, Toby | 612 | 3,353 | 16,714 | 57,362 |
|     Charles, Ray | 645 | 5,382 | 20,417 | 57,362 |
|     Daniels, Jeff | 633 | 4,596 | 17,263 | 57,362 |
|     Jefferson, Martin | 589 | 4,047 | 17,911 | 57,362 |
|     Smith, John | 591 | 3,895 | 21,723 | 57,362 |
|     Williams, Fred | 698 | 5,849 | 15,841 | 57,362 |
|   + QA (3) | 0 | 0 | 0 | 0 |
| + Finance (2) | 0 | 10 | 53 | 136 |
| + Human Resources (1) | 0 | 0 | 20 | 32 |
| + Marketing (3) | 102 | 432 | 1,759 | 4,352 |
| + Sales (5) | 0 | 5 | 47 | 268 |

FIG. 6B

File Activity Report

User(s): Albert Grimley
Application: Any
Operation: All Operations
Drive Type: All Drives File Type: Office Documents
Filename:

Start Date: June 6 2003
End Date: June 7 2003

| User | Machine | Date | Application | Operation | Bytes Read | Bytes Written | Drive Type | File Name |
|---|---|---|---|---|---|---|---|---|
| Albert Grimley | GRIM | 06-JUN-03 02:32:13 PM | Word | Edit | 65,960 | 68,135 | | design specs.doc |
| Albert Grimley | GRIM | 06-JUN-03 03:04:05 PM | Explorer | Copy | 4,714,496 | 2,318,336 | | competitive summary.doc |
| Albert Grimley | GRIM | 06-JUN-03 03:05:31 PM | Explorer | Copy | 5,332,992 | 2,627,584 | | sales pitch v14b.ppt |
| Albert Grimley | GRIM | 06-JUN-03 03:05:50 PM | Explorer | Copy | 4,481,024 | 2,204,160 | | sales pitch v18.ept |
| Albert Grimley | GRIM | 06-JUN-03 03:06:23 PM | Explorer | Copy | 5,554,176 | 2,725,376 | | customer list.doc |
| Albert Grimley | GRIM | 06-JUN-03 03:06:47 PM | Explorer | Copy | 4,710,400 | 2,312,192 | | product overview |
| Albert Grimley | GRIM | 06-JUN-03 03:07:14 PM | Explorer | Copy | 4,321,380 | 2,109,440 | | product overview v4.doc |
| Albert Grimley | GRIM | 06-JUN-03 03:07:48 PM | Explorer | Copy | 7,643,136 | 3,771,392 | | marketing slides/1.ppt |
| Albert Grimley | GRIM | 06-JUN-03 03:09:02 PM | Explorer | Copy | 3,821,568 | 1,854,464 | | marketing slides/2.ppt |
| Albert Grimley | GRIM | 06-JUN-03 03:09:51 PM | Explorer | Copy | 3,444,960 | 1,660,416 | | marketing slides/3.ppt |

DIGITAL ASSET USAGE ACCOUNTABILITY VIA EVENT JOURNALING

RELATED APPLICATION

This application is a continuation of U.S. application Ser. No. 10/716,336 filed on Nov. 18, 2003, now U.S. Pat. No. 7,474,272, which is a continuation of U.S. application Ser. No. 10/655,573 filed on Sep. 4, 2003, now abandoned which claims the benefit of U.S. Provisional Application No. 60/442,464 entitled "Method and System for Adaptive Identification and Protection of Proprietary Electronic Information," filed on Jan. 23, 2003. The entire teachings of the above-referenced applications are hereby incorporated by reference.

BACKGROUND OF THE INVENTION

Data security has been a significant issue facing system administrators since almost the inception of the data processing industry. Most computer users recognize the possibility of theft or misuse of data by unauthorized outsiders. The terms "hackers" or "crackers" are often used to describe such outsiders who attempt to gain access to a system, and who are typically not involved in any way with an organization's operations, its internal employees or systems. Many different solutions already exist to protect an organization's data processing infrastructure from this kind of threat. These include physical access control, firewalls, sniffers and other network monitors, data encryption, intrusion detection systems and other solutions. These solutions are generally recognized as being adequate for their intended purpose most of the time.

However, there is a second class of computer users that also pose a security threat. Protection from these unauthorized insiders requires a different approach, but one that is also well known. Almost since the inception of disk-based storage systems, the concept of access control has been applied to limit the ability of certain users to access certain important files. Using these techniques, now a universal feature of in any Operating System (OS), a desktop and/or network file server can provide for limited read, write, public, private and other types of access to files, directory structures and the like, depending upon permissions granted to particular users. Permissions can be attached to user accounts by a system administrator, based on their need to know, departments in the organization of which a user is a member, and so forth.

Even when users obtain access to only a portion of a system, however, they can still use a variety of techniques to steal and/or damage information. These can include simple browsing for unsecured information in a network, and/or removal or deletion of information made available as a result of poor security practices. More sophisticated rogue users will employ network packet sniffers and/or spying software. Fortunately, a variety of approaches, such as centralized document and digital rights management systems, network auditing, and file management tools, are effective tools against unauthorized use by insiders.

For example, U.S. Pat. No. 6,510,513 issued to Danieli and assigned to Microsoft Corporation describes a security and policy enforcement system that utilizes a series of transactions between a server and a client using electronic security certificates. A first client generates a request for access to data by submitting a security certificate containing a digest to a trusted arbitrator server. The trusted arbitrator authenticates the first client's credentials and returns the security certificate. The data and security certificate are then combined to create a distribution, which, in turn, is acquired by a second client. The second client extracts the security certificate and generates a digest from the data in the distribution. If the digest from the second client matches the digest from the first client, then data is considered to be valid. Depending upon the certificate type and a policy level, the trusted arbitrator server can provide services such as notification of improper usage.

U.S. Pat. No. 6,427,140 assigned to Intertrust Technologies is another type of digital rights management system. A system such as this is intended, for the most part, to protect the rights of various participants in a transferring sensitive data, such as in an electronic commerce or other electronic facilitated transactions.

SUMMARY OF THE INVENTION

Neither of these solutions do much to protect misuse of information by authorized insiders. This class of users has a trusted status, as they are supposed to have access to important data files to carry out their assigned tasks. Thus, they are routinely granted permission to use such information on a daily basis, and their use is not normally suspect. The problem comes when a class of trusted users abuse that trust by copying and/or distributing sensitive information to outsiders or other unauthorized people. Such events can happen quite easily and with increasing frequency when a disgruntled or departing employee wishes to damage an organization.

What prior art security systems fails to account for is the fact that once granted access to sensitive information, it is quite easy for authorized users to distribute it in many different ways. The proliferation of Internet connections, e-mail, instant messaging, removable media storage devices, such as Compact Disk-Read Write (CD-RW) drives, Universal Serial Bus (USB) type memory and storage devices, and the like, it makes it a trivial task to copy vast amounts of information almost instantaneously. Other peripheral devices, such as wireless modems, wireless local network cards, portable computers, Personal Digital Assistants (PDAs), network tunnels, and the like, provide further vehicles by which an authorized user may distribute copies of files outside of the trusted system environment. Even an act of printing the contents of a file is a potentially damaging event.

This is the case even when sophisticated file management and access control systems are employed to control access to and even monitor usage of files. The root of the problem stems from the fact that once an authorized user opens a file, its contents are no longer controllable. Specifically, copies of the file contents may be taken "out of" the controlled environment of a network or file management system.

The present invention is intended to address security problems that originate with authorized users abusing their authority, by providing a usage accountability model for data security.

In particular, an autonomous, independent agent process, such as running in the background of a client Operating System (OS) kernel, interrupts requests for access to resources. Such resource access requests may include, for example, requests to read a file, open a network connection, mount a removable media device, and the like). Since access is detected at the OS kernel level, tracking of resource utilization will occur regardless of whether the original access request originated from an application program that is being executed by an end user, indirectly by applications on behalf of users, or even by system requests made independently of application software.

The autonomous independent agent process contains sensors that capture low level system events. These may include, for example, operations such as file read, file write, file copy, clipboard cut, clipboard copy, CD-RW access, TCP/IP network message inbound, TCP/IP network message outbound and the like.

Low level events are then associated with one or more file names (handles) and filtered against an approved list. Thus, the raw events are filtered to remove references to files such as operating system files (.EXE, .DLL, etc.) and the like that do not contain sensitive application data. Only events relating to application files that may contain sensitive data are thus further tracked.

The filtered results are then bundled together and sent securely to a journaling server. The journaling server unbundles the list of events and stores them in an event database. The journaling server also periodically looks at a series of events in order to recognize an aggregate event as a possible abuse of trust situation. Such aggregate events are also then typically also added to the database.

For example, an aggregate "FileEdit" event might be reported by the journaling server when a user has opened and modified a sensitive financial document, with that user then printing the document before renaming it and saving a it to a newly attached USB hard drive. A set of reports can then be generated from journaled aggregate events to provide a comprehensive understanding of how files were accessed, used and communicated by individual users in an enterprise. Summary and trend reporting, for example, can show the volume and type of information that flows, and possible links between aggregate events for particular suspect users based on a variety of criteria.

Activity journals can also be sorted by user, a file, application, network connection, storage media, and the like. The result is an audit trail that can be used for a variety of purposes to determine, for example, which files have been attached to emails sent through a personal email server, which users have access specific client files and which documents have a recently departed employee burned to a CD-RW or printed to a home printer in the last month, or other possible abuses of authority.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A-4B are a table of possible low level atomic events.

FIGS. 5A-5D are a table of higher level aggregate events.

FIGS. 6A-6C show reports that can be generated by the invention.

DETAILED DESCRIPTION OF A PREFERRED EMBODIMENT

Figure 1:
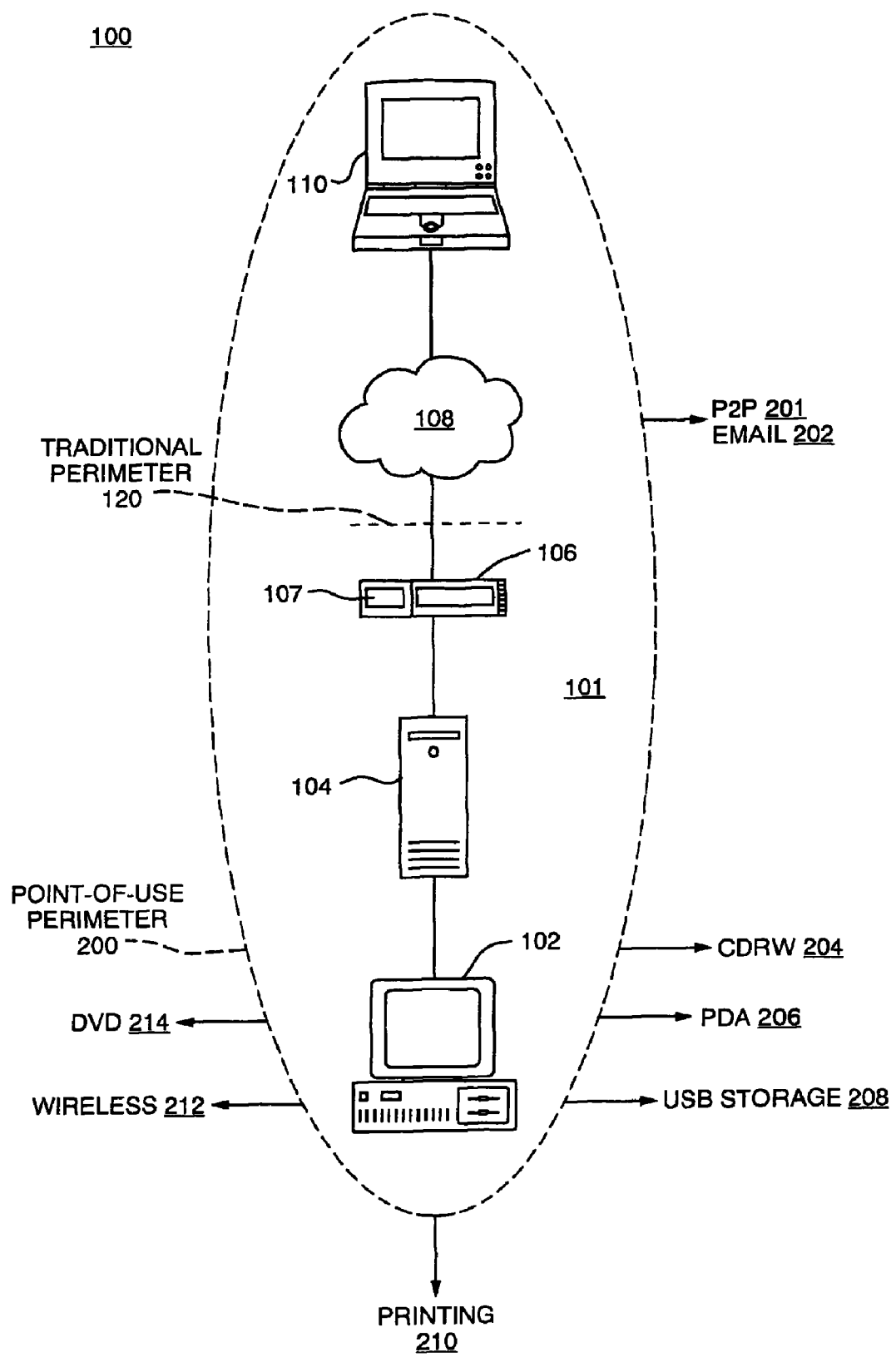
FIG. 1 is a diagram illustrating traditional security perimeters in a data processing system and a point of use perimeter that can be implemented with the present invention.

FIG. 1 is a diagram of a typical computer network 100 which consists of client devices 102 and servers 104 connected via local area network and/or inter-networking equipment. Connections to an outside network, such as the Internet 108, are made through devices such as routers or gateways 106. Connections through the Internet 108 can be also made to external computers 110 that form a trusted extranet.

A traditional security model is used to prevent access by an untrusted outsider 110 to devices 102 and/or file servers 104 within the protected network 100. A network perimeter 120 is thus associated with network points of access, such as through router 106 and specifically at a firewall 107. The firewall 107 can thus prevent attempts by unauthorized users of outside computers 110 to access information stored in the server 104 or otherwise manipulate the local computers 102. Firewalls 107 can also establish a perimeter 120 for outgoing access such as, for example, by users attempting to access certain undesirable outside computers 110 that contain restricted or harmful websites, game servers, and the like.

Rather than establishing a perimeter at external points of physical access to a network, the present invention establishes a perimeter of accountability for file usage. The accountability model can not only track authorized users of the computer 102 accessing files stored on a local server 104, but more importantly also monitors passage of such files to peripherals that distribute or record information, or other possible abuse events.

Such possible abuse events may occur whenever a user accesses devices which are not visible to or controllable by a local file server 104 or firewall 107. These events may include writing files to uncontrolled media such as CD-RWs 204, PDAs 206, USB storage devices 208, wireless devices 212, digital video recorders 214, or even printing of files. Other suspect events can include running external Peer to Peer (P2P) applications 201, sending files via external e-mail applications 202, uploading files to web sites via the Internet 108, and the like. Thus, the invention can provide an enterprise-wide journal of all file, application and network use. As will be understood shortly, the heart of this journaling approach consists of a high level contextual stream that characterizes user activity as it occurs at the point of use, such as the desktop 102 or file server 104.

Figure 2:
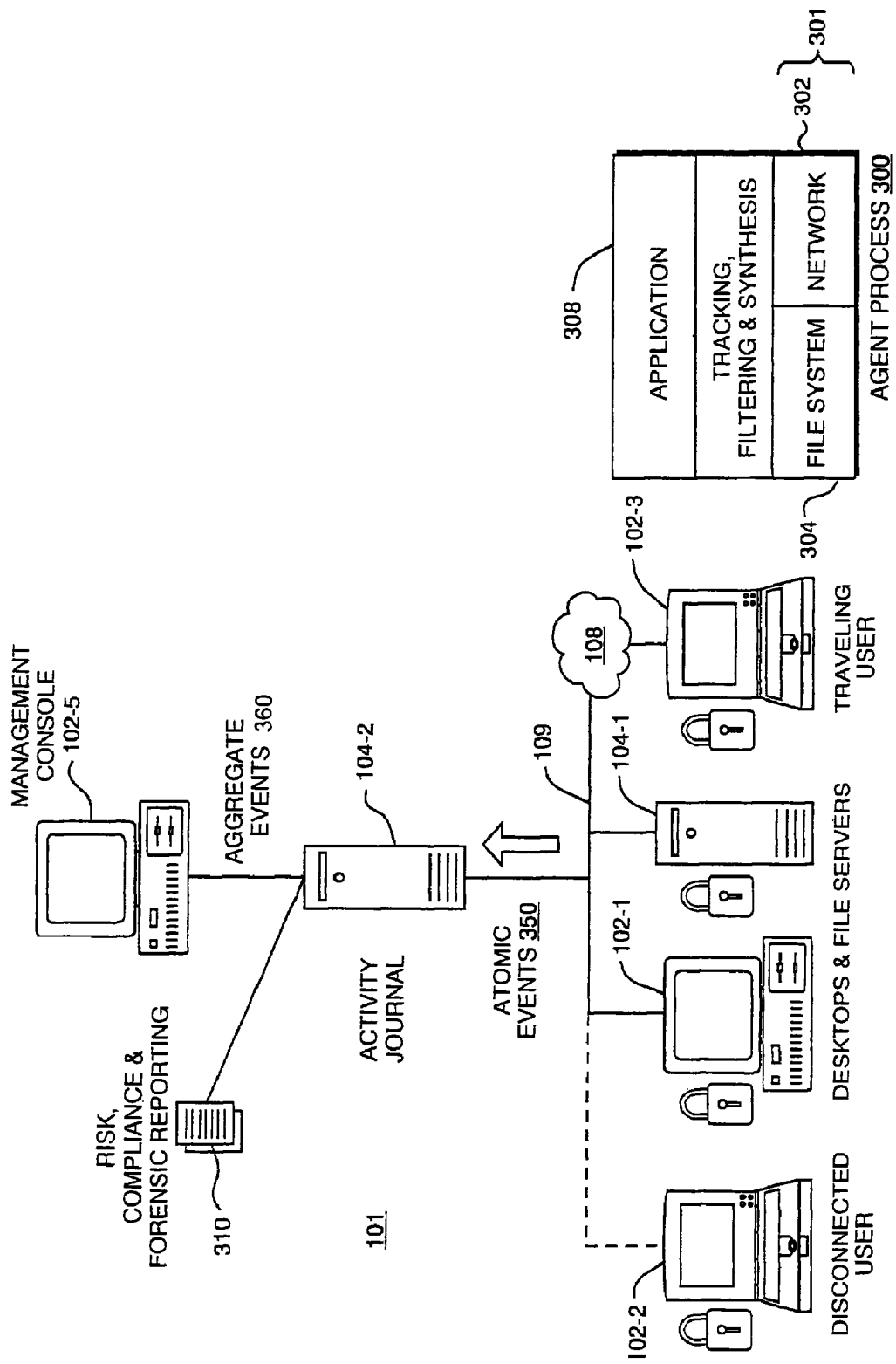
FIG. 2 is a diagram illustrating how events at client computers and file servers in a network are sensed, bundled, and sent to an activity journal server.

Turning attention to FIG. 2, the activity journalling process will now be described in more detail. An agent process 300 is interposed between an Operating System (OS) 301 and applications 308 as they run on clients 102 and/or servers 104 within the network 101. The agent process 300 is used to detect and track file, printing, clipboard, and I/O device operations, such as file read or write operations, or network data transfers.

While the clients normally include desktops 102-1 which have a direct wired (or wireless) connection 109 to the local network 101, the agent 300 may also run on disconnected client computers such as laptops 102-2, making a report of events once a connection is eventually made to the network 100.

In a manner that will be described shortly, the agent 300 reports atomic events 350 to an activity journaling process typically running on an activity journaling server 104-2. The journaling server 104-2 processes atomic event data and coalesces it into what are called aggregate events 360. Aggregate events 360 are detected when a certain predetermined sequence of atomic events occurs. Each aggregate event 360 is thus composed of one or more atomic events 350 that conform to some predetermined pattern indicative of activity that should be monitored.

Specific types and/or sequences of atomic events 350 that lead to aggregate events 360 will be described in detail later. It should be appreciated here, however, that the particular events reported and their aggregation types depend upon the specific activities sought to be monitored.

To protect the network completely, typically the agent process 300 would reside on all desktops 102 and file servers 104 associated with an enterprise's networks. The activity journaling server 104 and agent process 300 may communicate through secure, networking based applications such as the Microsoft ".NET" infrastructure or other secure networking systems. A management console 102-5 permits access to the database stored in the journaling server 104-2, and is used specifically to provide risk compliance, forensic reporting, and similar reports 310 to administrative users of the system.

Figure 3:
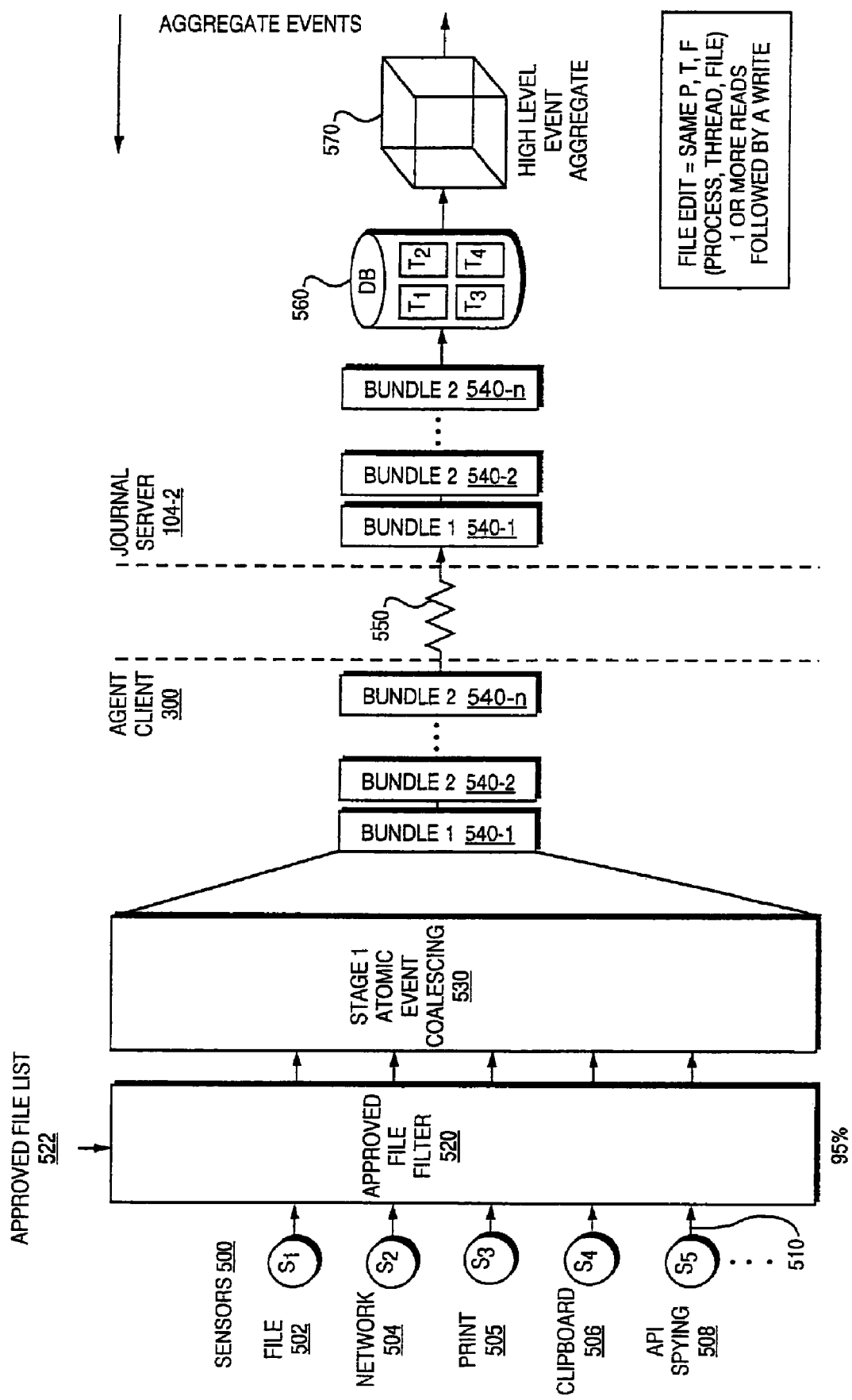
FIG. 3 is a process flow diagram illustrating the invention more particularly.

FIG. 3 is a more detailed view of the client agent 300 and journaling server 104-2. These elements particularly consist of one or more sensors 500, file filter 520, event coalescing aggregation 530, network connection 550, database 560, and high level event aggregation 570 to perform an event detection and aggregation. It should be further noted that the agent process 300 can also provide real time evaluation and potentially enforcement of rules.

The journaling server 104-2 may typically run within a Windows 2000 Server environment having a secure .NET framework. The journaling server 104-2 also has access to a database, such as Microsoft SQL Server 2000 for example, to provide record storage and retrieval functions. It is to be understood, of course, that the processes described herein can be implemented on other types of operating systems, server platforms, database systems, and secure networking environments.

As already mentioned, the agent 300 typically runs as a kernel process in a client Operating System (OS). For example, the agent 300 may run within the kernel of Microsoft Windows 2000 or Windows XP. Autonomous operation of the agent 300 provides for detection of atomic events 350 even when client 102 is disconnected from the network 100. Any such events are reported when the client 102 is reconnected and can communicate with the journaling server 104-2.

In a preferred embodiment, the agent 300 will run multiple services under Windows so that if one service is stopped by a malicious user, the other one may restart the other process. The process is also hid from a task manager or similar processes in the operating system and will be able to work with safe mode boot features in order to guarantee full protection.

Turning attention to the agent 300, atomic event sensors 500 provide atomic events as output when action typically associated with Input/Output (I/O) drivers are intercepted at the OS kernel. The agent process 300 is therefore transparent to the end user and tamper resistant. The intercept may, for example, occur during an I/O Request Packet (IRP) in an interruptible kernel. The sensors 500 may include, for example, file operation sensor 502, network operation sensor 504, print queue sensor 505, clipboard sensor 506, Application Programming Interface (API) spy sensor 508 and other sensors. Events may be provided for example, by Windows services and kernel level drivers.

Data collected with an event depends on the event type, but can include:

For invoked applications, the identity of the invoking process, executable name, start time, end time, and process owner For user operations, such as log on or log off, the time and user identification (ID)

For file operations, source/destination file name, operation type (open, write, delete, rename, move to recycle bin), device type, first and last access time For network operations, source/destination address, port and host names, start/end time stamp, bytes sent and received, inbound and outbound data transmission times For CD-RW operations, file names, start/end times and amount of data transferred For printing operations, full path or file name, event start time or print job name For clipboard operations, destination process ID, event start time, full path of filename involved For other high level operations, such as access to removable storage media, file name, device ID, time of day, bytes transferred, and the like An approved file filter 520 operates to automatically filter the dozens of inconsequential events generated by standard calls to system files. For example, it is quite common for many different .EXE and .DLL operating system files to be opened and accessed repeatedly in a typical executing Windows application. In order to reduce the data flow to the journaling server 104-2, the file filter 520 uses an approved file list 522 to filter atomic (raw) sensor events 510.

The approved file list 522 may be implemented by a list of file names associated with events. However, in a preferred embodiment, the well known MD5 algorithm is used to generate a hash code for each file name. The MD5 hash code for a filename associated with an event is then matched against the approved list 522, rather than the complete file handle, to speed up the filtering process. Thus, only events associated with unapproved files are passed down to the coalescing stage 530.

The next stage is an atomic event coalescing stage 530 that attempts to aggregate atomic events 510. The coalescing function further filters atomic events 510 associated with or related to a single user action between the agent 300 and the journaling server 104. In general, applications frequently read small chunks of a file and not the entire file at the same time. For example, a user may open a 2 MegaByte (MB) spreadsheet file. However the OS may at a given time actually only access chunks of the spreadsheet file that are much smaller than that, such as 5 or 10 KiloBytes (KB) at a time. Thus, a typical pattern of access is to see a file open atomic event, followed by multiple read atomic events to the same file. If this sequence of atomic events is seen from the same process and the same executable with the same thread ID and the same file handle, event coalescing 530 will thus count only a single "FileOpen" event. In a preferred embodiment, there is a time attribute associated with event coalescing 530 such that if a time limit typically measuring in minutes of time is exceeded, at least one event will be reported between raw level events.

The coalesced events are then grouped together in bundles 540-1, 540-2 . . . , 540-n. A bundle 540 consists of a number of events that are grouped together for the convenience of transmission from the client 300 to the server 104-2.

Communication between the agent 300 and journaling server 104-2 preferably takes place over a fault tolerant, encrypted, asynchronous communication channel 550, such as a Hyper Text Transfer Protocol Secure (HTTPS) channel. For example, the Public Key Infrastructure (RSA/PKI) available from RSA Security, Inc. can be used for symmetric encryption. The agent 300 holds a service certificate (server public key) that it uses to encrypt one time session keys, on a per packet basis, to implement symmetric cryptography.

Compression and other data reduction techniques can also be applied to the bundles prior to their transmission over the network connection 550. With file filtering 522 and atomic event coalescing 530, it is expected that the size of the activity journal to be communicated to the server 104-2 typically is on the order of only about 150 Kb per user per day.

On arriving at the journaling server 104-2, bundles 540 are decompressed and decrypted, returned to their original state, and placed in the database 560 as the atomic event table. This table holds a de-multiplexed version of low level coalesced events so that they may be processed as a single stream.

A high level event aggregation process 570 then periodically reads events from the database table 560 as a stream and determines if high level aggregate events have occurred. This can be done by running queries on the database 560 to determine if a sequence of atomic events has occurred in patterns than are defined in advance.

A comprehensive list of typical high level event patterns is shown in FIG. 4A-4B. For example, 43 different action types, some of which are low level atomic events and others which are high level aggregate events, are defined in the preferred embodiment. A given event is composed of several fields in the database, including perhaps an action type 571, level 572, event category 573, event name 574, event table ID 575, action detail 576, action detail value 577, and discriminants 578.

Event categories are associated with each event type. For example, in an event category "file", event names include file read, file write, file rewrite, file copy, file rename, file delete, file move, file recycle, file restore. Similarly, network related events are TCP/IP inbound, TCP/IP outbound, USB inbound and so forth.

A scope is also associated with each event type. A scope is defined as either being a thread, process, login, machine, or all type scope. For example, "process" scope is an event that is consolidated into a high level event in the same process but not necessarily executing the same thread. "Machine" means that a reboot could occur between two events that occurred on the same machine.

Attributes commonly recorded for all high level events include an action type, an event count, bytes read count, bytes written count, event start, event end, and other possible actions. Source and destination hold numerous other attributes including the file, path, process, thread, and application identifying information that performed the event.

Other types of system events may include print events, CD events, clipboard, user and machine events. The final type of low level event may be process events including process start and process end.

The database 560 will eventually include a series of various events, such as file events, network events, print events, CD events, user events, machine event, process, machine device and other events.

High level aggregate events are created by detecting a combination of the occurrence of low level events. More particularly, a high level aggregate event (action types 26-42) is determined after seeing a specific sequence of lower level events (action types 1-25). For example, action type 26 is a high level event called "FileEdited". This is an aggregate event that determines when a file has been edited. As the table indicates, the high level event aggregated process 570 may detect that a particular process, thread, and file has performed one or more reads to a particular file handle, followed by a write operation to the same process, thread and file handle. The event is then defined as an aggregate "File Edited" event.

Aggregate events are defined in greater detail in FIGS. 5A, 5B, 5C and 5D. For example, a "Clipboard to File" aggregate event 510 is defined as detecting a clipboard cut or copy followed by a clipboard paste to file operation.

Similarly, a "BurnFile" event is associated with detecting a CD write atomic event followed by a file read atomic event.

Thus, if a series of file reads are detected from one file handle, followed by a series of CD write events with the same process, the application is recognized as having written a file to a CD-RW.

Numerous other aggregate events are possible; the list in FIGS. 5A, 5B, 5C and 5D is only meant to illustrate a few of the many possibilities.

FIG. 6A is an example summary report that can be generated from the aggregate event. In particular, statistics can be taken on a daily, weekly or other basis to list when digital assets have been removed to uncontrolled media, when digital assets have moved to external networks or to other uncontrolled environments. Reports can be provided in this summary form, or can be of course provided in more detailed format, as shown in FIG. 6B, arranged by department and even by a particular user. Patterns of unexpected behavior can then be determined from such reports.

Further detail such as arranged by a particular user can be provided in a report as shown in FIG. 6C. Here, a particular user, Albert Grimley, is seen to have made copies of design specification files, sales pitches, customer lists, product overviews, and marketing slides. If such activities are not normally expected to be authorized for Mr. Grimley, such as for example, if his job responsibilities are to assist the engineering development team, and he is not in the marketing department, activities such as copying customer lists, sales pitches and marketing slides might be considered to be suspect, requiring further action by the organization's management.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for providing usage accountability of a digital asset in a data processing system, comprising:
    a client device having (i) a sensor located within an operating system kernel of the client device and configured to sense atomic-level events relating to authorized access to the digital asset by an end user of the client device, and (ii) a coalescing aggregator configured to aggregate multiple atomic-level events relating to a single end-user's action into a coalesced atomic-level event, the coalesced atomic-level event being a single atomic-level event selected from the multiple atomic-level events; and
    a journaling server in communication with the client device and having (i) a high-level aggregator configured to generate a high-level aggregate event by aggregating multiple atomic-level events, including at least one coalesced atomic-level event, based on a predetermined sequence of atomic-level events, and (ii) a reporter configured to generate an audit trail from one or more aggregate events, the audit trail representing usage of the digital asset by the end user.

2. A system as in claim 1 wherein the client device further includes a filter configured to filter the atomic-level events with an approved event list, filtering-out atomic-level events corresponding to events on the approved event list.

3. A system as in claim 2 wherein the approved event list includes a list of approved file identifiers.

4. A system as in claim 3 wherein the file identifiers are a hash code.

5. A system as in claim 1 wherein the audit trail is determined to indicate a suspect action with the digital asset.

6. A system as in claim 1 wherein the coalescing aggregator creates a single atomic-level event after a given time-out period with no activity by the end user.

7. A system as in claim 1 wherein the audit trail is used to control security of the data processing system by determining patterns of unexpected behavior based on the audit trail.

8. A system as in claim 1 wherein the audit trail provides a perimeter of accountability for usage of the digital asset at a point of use of the digital asset.

9. A system as in claim 8 wherein the point of use is the client device and the accountability is of access, modification, and distribution of the digital asset.

10. A system as in claim 1 wherein the usage of the digital asset includes access and dissemination of the digital asset.

11. A system as in claim 1 wherein the aggregate event is attributable to the end user, a thread, or an application as identified at a known time.

12. A system as in claim 1 wherein the aggregate event is associated with a particular executing process.

13. A system as in claim 12 wherein the executing process is associated with the end user.

14. A system as in claim 1 wherein bundles of coalesced atomic-level events are created before transmitting the coalesced atomic-level events from the client device to the journaling server.

15. A system as in claim 14 wherein sequence numbers are added to the bundles.

16. A method for providing usage accountability of a digital asset in a data processing system, the method comprising:

sensing atomic-level events within an operating system kernel of a client device, the atomic-level events relating to authorized access to the digital asset by an end user of the client device;

aggregating multiple atomic-level events relating to a single end-user's action into a coalesced atomic-level event, the coalesced atomic-level event being a single atomic-level event selected from the multiple atomic-level events;

forwarding the coalesced atomic-level event to a journaling server;

generating a high-level aggregate event at the journaling server by aggregating multiple atomic-level events, including at least one coalesced atomic-level event, based on a predetermined sequence of atomic-level events; and generating an audit trail from one or more aggregate events, the audit trail representing usage of the digital asset by the end user.

17. A method as in claim 16 further including filtering the atomic-level events with an approved event list, and wherein forwarding the coalesced atomic-level events to the journaling server includes forwarding only atomic-level events not corresponding to events in the approved event list.

18. A method as in claim 17 wherein the approved event list includes a list of approved file identifiers.

19. A method as in claim 16 further including creating bundles of coalesced atomic-level events before transmitting the coalesced atomic-level events from the client device to the journaling server.

20. A method as in claim 16 wherein the usage of the digital asset includes access and dissemination of the digital asset.

* * * * *